United States Patent
Kigure

(10) Patent No.: US 10,527,644 B2
(45) Date of Patent: Jan. 7, 2020

(54) PHYSICAL QUANTITY DETECTION ELEMENT, PHYSICAL QUANTITY DETECTION DEVICE, ELECTRONIC APPARATUS, AND MOVING OBJECT

(71) Applicant: Seiko Epson Corporation, Tokyo (JP)

(72) Inventor: Shota Kigure, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/904,732

(22) Filed: Feb. 26, 2018

(65) Prior Publication Data

US 2018/0180641 A1 Jun. 28, 2018

Related U.S. Application Data

(63) Continuation of application No. 14/504,894, filed on Oct. 2, 2014, now Pat. No. 9,939,457.

(30) Foreign Application Priority Data

Oct. 3, 2013 (JP) ................. 2013-207963

(51) Int. Cl.
*G01P 15/125* (2006.01)
*G01P 1/00* (2006.01)
*G01P 15/08* (2006.01)

(52) U.S. Cl.
CPC ............ *G01P 15/125* (2013.01); *G01P 1/003* (2013.01); *G01P 2015/0831* (2013.01); *G01P 2015/0871* (2013.01); *G01P 2015/0874* (2013.01)

(58) Field of Classification Search
CPC .................................................. G01P 15/125

USPC .................................................. 73/514.32
See application file for complete search history.

(56) References Cited

U.S. PATENT DOCUMENTS

| 6,151,966 A | 11/2000 | Sakai et al. |
| 6,935,175 B2 | 8/2005 | Eskridge et al. |
| 7,140,250 B2 | 11/2006 | Leonardson et al. |
| 8,402,826 B2 | 3/2013 | Classen et al. |

(Continued)

FOREIGN PATENT DOCUMENTS

| JP | 11-326365 | 11/1999 |
| JP | 2008-531991 A | 8/2008 |

(Continued)

*Primary Examiner* — Nimeshkumar D Patel
*Assistant Examiner* — Jean F Morello
(74) *Attorney, Agent, or Firm* — Harness, Dickey & Pierce, P.L.C.

(57) ABSTRACT

A physical quantity detection element includes: a substrate; first and second fixed electrode portions on the substrate; a movable body on the upper portion of the substrate; and a beam on the movable body, the movable body includes a first movable body on a first side of the beam, and a second movable body on a second side of the beam, the first movable body includes a first movable electrode portion facing the first fixed electrode portion and a first mass portion disposed in an opposite direction of the beam from the first movable electrode portion, the second movable body includes a second movable electrode portion facing the second fixed electrode portion, a mass of the first movable body is greater than a mass of the second movable body, and a mass of the first mass portion is greater than a mass of the first movable electrode portion.

20 Claims, 9 Drawing Sheets

(56) References Cited

U.S. PATENT DOCUMENTS

| | | | |
|---|---|---|---|
| 2009/0031809 A1* | 2/2009 | Lin | G01P 15/125 |
| | | | 73/514.32 |
| 2010/0024553 A1 | 2/2010 | Classen et al. | |
| 2011/0138912 A1 | 6/2011 | Degawa et al. | |
| 2012/0216616 A1 | 8/2012 | Schultz | |
| 2012/0318060 A1 | 12/2012 | Ruby | |
| 2014/0345380 A1* | 11/2014 | Jia | B81B 3/0016 |
| | | | 73/514.32 |
| 2015/0020591 A1 | 1/2015 | Tanaka | |

FOREIGN PATENT DOCUMENTS

| | | |
|---|---|---|
| JP | 2010-512527 A | 4/2010 |
| JP | 2012-229939 A | 11/2012 |
| WO | WO-2006-091385 A1 | 8/2006 |

* cited by examiner

PHYSICAL QUANTITY DETECTION ELEMENT, PHYSICAL QUANTITY DETECTION DEVICE, ELECTRONIC APPARATUS, AND MOVING OBJECT

CROSS-REFERENCE TO RELATED APPLICATIONS

This application is a continuation of U.S. patent application Ser. No. 14/504,894, filed on Oct. 2, 2014, which claims priority to Japanese Patent Application No. 2013-207963, filed on Oct. 3, 2013. The disclosures of the above applications are incorporated by reference in their entireties.

BACKGROUND

1. Technical Field

The present invention relates to a physical quantity detection element, a physical quantity detection device, an electronic apparatus, and a moving object including the physical quantity detection element.

2. Related Art

In the related art, a physical quantity detection element which is configured based on a principle of a locker lever and detects capacitance which changes according to physical quantity such as acceleration has been known as a method of detecting physical quantity such as acceleration in a vertical direction. For example, JP-T-2010-512527 discloses a micromachining type Z sensor (physical quantity detection element) including a locker lever configured with a torsion spring, and a mass structure in which a seismic auxiliary mass body is provided on one side of the torsion spring and masses of both sides of the torsion spring are different from each other. In this physical quantity detection element, when the physical quantity such as acceleration in the vertical direction is applied, the locker lever having the greater mass of the mass body is pressed down, and capacitance formed between counter electrodes facing the mass body changes. The detection of the physical quantity such as acceleration is performed by measuring the change in capacitance.

In the physical quantity detection element having the above-described system, a penetration hole is provided on a movable body in order to prevent drag due to air generated between the movable body and a substrate (squeeze film damping: hereinafter referred to as damping), when the movable body (mass structure) is displaced towards the substrate on which fixed electrodes (counter electrodes) are formed. However, in the physical quantity detection element disclosed in JP-T-2010-512527, since a gap (web width) close to the penetration hole provided on a first mass portion (auxiliary mass body) is narrower than a gap close to the penetration hole provided on the movable body, the first mass portion is easily damaged when the impact is on the movable body. A decrease in mass of the first mass portion causes a decrease in sensitivity for detecting the physical quantity such as acceleration, and therefore miniaturization of the physical quantity detection element is difficult.

SUMMARY

An advantage of some aspects of the invention is to solve at least a part of the problems described above, and the invention can be implemented as the following forms or application examples.

Application Example 1

A physical quantity detection element according to this application example includes: a substrate; a first fixed electrode portion and a second fixed electrode portion provided on the substrate; a movable body provided on the upper portion of the substrate; and a beam provided on the movable body, in which the movable body includes a first movable body on a first side of the movable body with respect to the beam, and a second movable body on a second side of the movable body with respect to the beam, the first movable body includes a first movable electrode portion facing the first fixed electrode portion and a first mass portion disposed in an opposite direction of the beam from the first movable electrode portion, the second movable body includes a second movable electrode portion facing the second fixed electrode portion, a mass of the first movable body is greater than a mass of the second movable body, and a mass of the first mass portion is greater than a mass of the first movable electrode portion.

According to this application example, since the mass of the first movable body is configured to be greater than the mass of the second movable body and the mass of the first mass portion is configured to be greater than the mass of the first movable electrode portion, it is possible to provide a physical quantity detection element which can improve the sensitivity for detecting physical quantity and reliability and realize miniaturization.

Application Example 2

In the physical quantity detection element according to the application example described above, it is preferable that a thickness of the first mass portion is equivalent to a thickness of the first movable electrode portion.

According to this application example, by setting the mass per unit area of the first mass portion to be greater than the mass per unit area of the first electrode portion in the movable body in which the thickness of the first mass portion is equivalent to that of the first movable electrode portion, it is possible to improve the sensitivity for detecting physical quantity and reliability of the physical quantity detection element. In addition, since the thickness of the first mass portion is equivalent to that of the first movable electrode portion, it is possible to easily perform micromachining by etching or the like.

Application Example 3

In the physical quantity detection element according to the application example described above, it is preferable that a thickness of the first mass portion is greater than a thickness of the first movable electrode portion and a thickness of the second movable electrode portion.

According to this application example, the thickness of the movable body is different between the first movable electrode portion and the second movable electrode portion, and the first mass portion. Since the thickness of the first mass portion is greater than that of the first movable electrode portion and the second movable electrode portion, the mass of the first mass portion increases, and accordingly, torque for twisting the beam increases and the rigidity of the first mass portion also increases. Therefore, it is possible to improve the sensitivity for detecting physical quantity and reliability of the physical quantity detection element.

Application Example 4

In the physical quantity detection element according to the application example described above, it is preferable that a plurality of first penetration holes are provided in the first movable electrode portion, and a plurality of second penetration holes are provided in the first mass portion, and an average dimension of gaps between the second penetration holes adjacent to each other in a direction orthogonal to the extension direction of the beam is greater than an average dimension of gaps between the first penetration holes adjacent to each other in a direction orthogonal to the extension direction of the beam.

According to this application example, since the average dimension of gaps between the second penetration holes adjacent to each other in a direction orthogonal to the extension direction of the beam is greater than the average dimension of gaps between the first penetration holes adjacent to each other in a direction orthogonal to the extension direction of the beam, the mass of the first mass portion increases, and accordingly, the torque for twisting the beam increases and the rigidity of the first mass portion also increases. Therefore, it is possible to improve the sensitivity for detecting physical quantity and reliability of the physical quantity detection element.

Application Example 5

In the physical quantity detection element according to the application example described above, it is preferable that a plurality of first penetration holes are provided in the first movable electrode portion, and a plurality of second penetration holes are provided in the first mass portion, and an average dimension of gaps between the second penetration holes adjacent to each other in a direction parallel with the extension direction of the beam is greater than an average dimension of gaps between the first penetration holes adjacent to each other in a direction parallel with the extension direction of the beam.

According to this application example, since the average dimension of gaps between the second penetration holes adjacent to each other in a direction parallel with the extension direction of the beam is greater than the average dimension of gaps between the first penetration holes adjacent to each other in a direction parallel with the extension direction of the beam, the mass of the first mass portion increases, and accordingly, the torque for twisting the beam increases and the rigidity of the first mass portion also increases. Therefore, it is possible to improve the sensitivity for detecting physical quantity and reliability of the physical quantity detection element.

Application Example 6

In the physical quantity detection element according to the application example described above, it is preferable that buffer portions are provided on a surface of the first mass portion on the substrate side.

According to this application example, since the buffer portions are provided on the first mass portion which may come in contact with the substrate due to great physical quantity applied to the movable body, it is possible to buffer an impact applied to the first mass portion. Since the mass of the buffer portions is added to the first mass portion, the mass of the first mass portion increases and torque for twisting the beam increases. Therefore, it is possible to improve the sensitivity for detecting physical quantity and reliability of the physical quantity detection element.

Application Example 7

In the physical quantity detection element according to the application example described above, it is preferable that an electrode is provided on a surface of the first mass portion on the substrate side.

According to this application example, since a load of the electrode is added to the first mass portion, the mass of the first mass portion increases and torque for twisting the beam increases. In addition, since the hardness of aluminum or gold used as the electrode material is low, it is possible to buffer an impact applied to the first mass portion. Therefore, it is possible to improve the sensitivity for detecting physical quantity and reliability of the physical quantity detection element.

Application Example 8

In the physical quantity detection element according to the application example described above, it is preferable that, when the movable body is divided into two by a center line in a direction orthogonal to an extension direction of the beam at an area ratio, masses of the divided portions are equivalent to each other.

According to this application example, since the masses of the divided portions obtained by dividing the movable body into two by a center line in the direction orthogonal to the extension direction of the beam are equivalent to each other, it is possible to cause the movable body to perform see-saw swinging using the beam as a fulcrum, while maintaining both short sides parallel with the extension direction of the beam to be horizontal, when physical quantity such as acceleration in a vertical direction is applied to the movable body. Accordingly, it is possible to prevent torsional swing (vibration) of the movable body and therefore it is possible to improve sensitivity for detecting physical quantity of the physical quantity detection element.

Application Example 9

In the physical quantity detection element according to the application example described above, it is preferable that the movable body is provided line-symmetrically with respect to a center line in a direction orthogonal to an extension direction of the beam.

According to this application example, since the movable body is provided line-symmetrically with respect to the center line in the direction orthogonal to an extension direction of the beam, the mass and the damping received by the movable body (air drag) are also symmetrical. Accordingly, an effect of preventing torsional swing of the movable body increases, and therefore it is possible to improve sensitivity for detecting physical quantity of the physical quantity detection element.

Application Example 10

A physical quantity detection device according to this application example includes: the physical quantity detection element according to the application example described above; and a detection circuit which outputs a signal according to physical quantity applied to the physical quantity detection element.

According to this application example, it is possible to provide a physical quantity detection device including a physical quantity detection element with improved sensitivity for detecting physical quantity and reliability.

Application Example 11

An electronic apparatus according to this application example includes the physical quantity detection element according to the application example described above.

According to this application example, it is possible to provide an electronic apparatus including a physical quantity detection element with improved sensitivity for detecting physical quantity and reliability.

Application Example 12

A moving object according to this application example includes the physical quantity detection element according to the application example described above.

According to this application example, it is possible to provide a moving object including a physical quantity detection element with improved sensitivity for detecting physical quantity and reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. In each drawing hereinafter, scales of layers or members are different from the actual scales thereof, in order to have recognizable sizes of the layers and the members.

Embodiment 1

Figure 1:
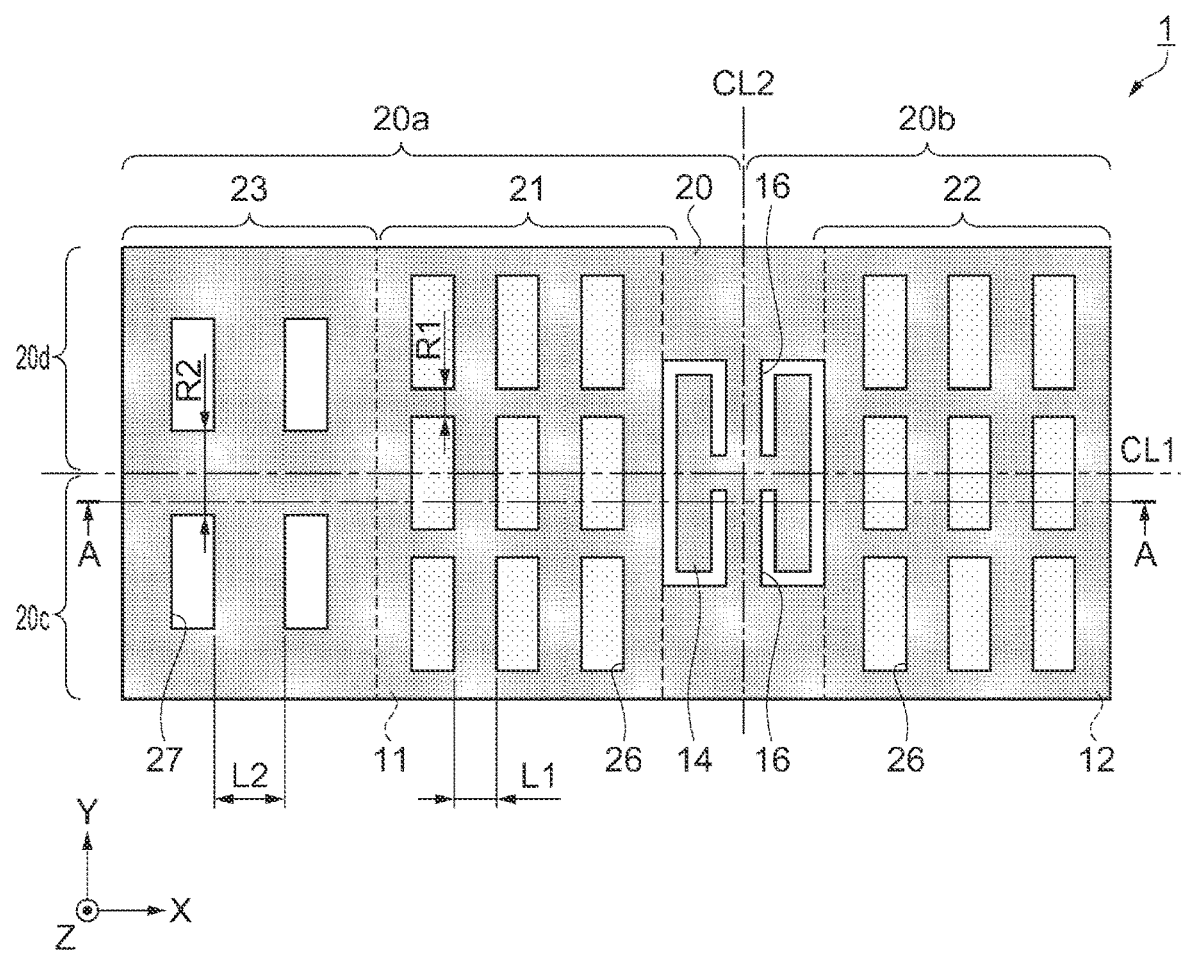
FIG. 1 is a plan view schematically showing a physical quantity detection element according to Embodiment 1.
Figure 2:
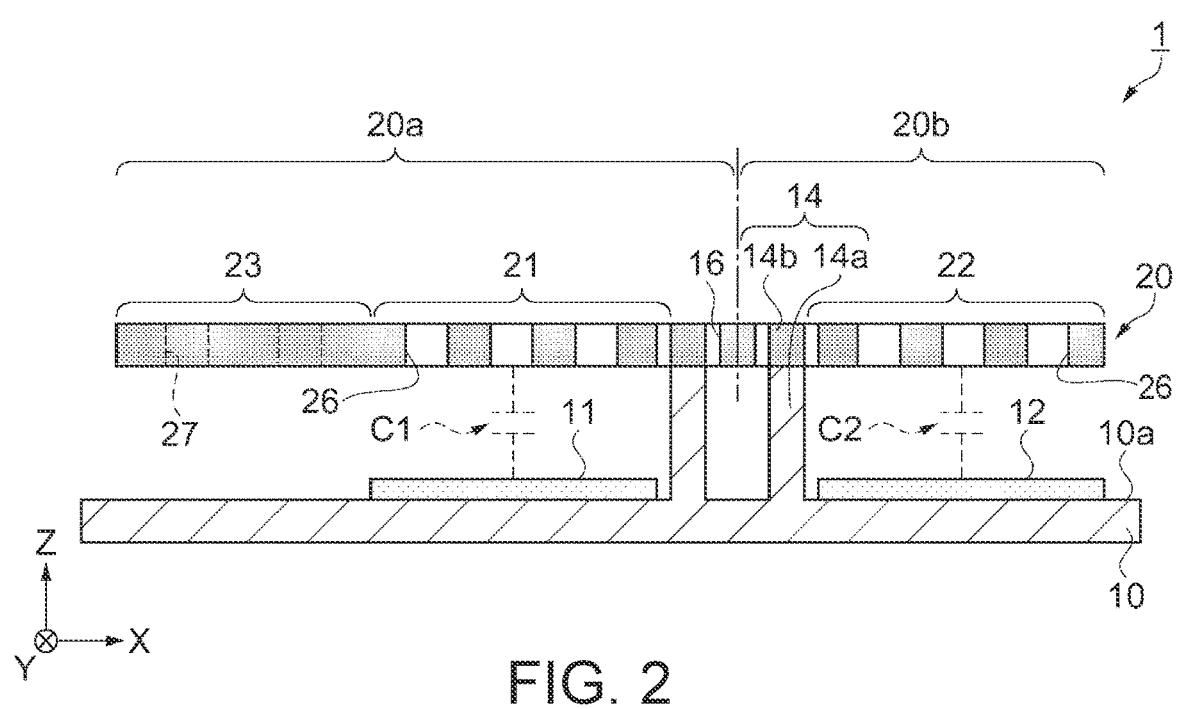
FIG. 2 is a cross-sectional view taken along line A-A in FIG. 1.

FIG. 1 is a plan view schematically showing a physical quantity detection element according to Embodiment 1. FIG. 2 is a cross-sectional view taken along line A-A in FIG. 1. Herein, in FIGS. 1 and 2, and FIGS. 3A to 9 which will be described later, an X axis, a Y axis, and a Z axis are shown as three axes orthogonal to each other, and a distal side of an arrow shown in the drawings is set as a "positive side" and a proximal side thereof is set as a "negative side", for convenience. Hereinafter, a direction parallel with the X axis is referred to as an "X axis direction", a direction parallel with the Y axis is referred to as a "Y axis direction", and a direction parallel with the Z axis is referred to as a "Z axis direction".

First, a schematic configuration of a physical quantity detection element according to Embodiment 1 will be described with reference to FIGS. 1 and 2.

A physical quantity detection element 1 of the embodiment can be used as an inertial sensor, for example. Specifically, the physical quantity detection element can be used as a sensor (capacitance type acceleration sensor or capacitance type MEMS acceleration sensor) element for measuring physical quantity such as acceleration in a vertical direction (Z axis direction).

As shown in FIGS. 1 and 2, the physical quantity detection element 1 includes a substrate 10, a first fixed electrode portion 11 and a second fixed electrode portion 12 provided on a main surface 10a of the substrate 10, a movable body 20 which is provided with a gap interposed between the movable body and the substrate 10, through a support 14 which is provided to stand in the positive Z axis direction from the main surface 10a between the first fixed electrode portion 11 and the second fixed electrode portion 12 and a beam 16 supported by the support 14. The beam 16 functions as a so-called torsion spring and rotatably supports the movable body 20. The support 14 is configured with a support 14a which is integrally formed with the substrate 10 and a support 14b which is integrally formed with the movable body 20.

A material of the substrate 10 is not particularly limited, but in the embodiment, an insulating material including borosilicate glass is used as a preferable example. The support 14a provided on the substrate 10 can be formed by performing micromachining such as photolithography and etching of the substrate 10.

The first fixed electrode portion 11 is positioned on the negative X axis direction side with respect to the support 14a in a side view from the Y axis direction, and is provided in an area overlapped with a first movable electrode portion 21, which will be described later, provided on the main surface 10a of the substrate 10 in a plan view from the Z axis direction.

The second fixed electrode portion 12 is positioned on the positive X axis direction side with respect to the support 14a in a side view from the Y axis direction, and is provided in an area overlapped with a second movable electrode portion 22, which will be described later, provided on the main surface 10a of the substrate 10 in a plan view from the Z axis direction.

For example, platinum (Pt), aluminum (Al), molybdenum (Mo), chrome (Cr), titanium (Ti), nickel (Ni), copper (Cu), silver (Ag), gold (Au) or an alloy having the metal as a main component is used for the first fixed electrode portion 11 and the second fixed electrode portion 12. A sputtering method, for example, is used for forming the first fixed electrode portion 11 and the second fixed electrode portion 12 as films, and photolithography and etching, for example, are used for patterning (outer shape formation) thereof.

The movable body 20 is integrally formed with the support 14b and the beam 16 supported by the support 14b, and is provided with a gap interposed between the movable body and the substrate 10, through the supports 14a and 14b and the beam 16. In the movable body 20, a first movable electrode portion 21 and a first mass portion 23 are provided in this order in the negative X axis direction from the beam 16, and a second movable electrode portion 22 is provided in the positive X axis direction from the beam 16. In a plan view from the Z axis direction, the first movable electrode portion 21 is positioned in an area overlapped with the first fixed electrode portion 11, and the second movable electrode portion 22 is positioned in an area overlapped with the second fixed electrode portion 12. In the description hereinafter, in the movable body 20, an area on the negative X axis direction from a center line CL2 of the beam 16 is referred to as a first movable body 20a, and an area on the positive X axis direction from the center line CL2 of the beam 16 is referred to as a second movable body 20b.

The movable body 20 has a rectangular plate shape in a plan view from the Z axis direction, and in the embodiment, a dimension of the first mass portion 23 in a thickness direction (Z axis direction) is equivalent to each dimension of the first movable electrode portion 21 and the second movable electrode portion 22 in the thickness direction (Z axis direction). Therefore, it is possible to easily perform micromachining for forming the movable body 20. A material of the movable body 20, the support 14b, and the beam 16 is not particularly limited, and a conductive material including silicon is used, as a preferable example. It is possible to integrally form the movable body 20, the support 14b, and the beam 16 by micromachining such as photolithography and etching. The conductive material is used for the movable body 20 in order to cause each of the first movable electrode portion 21 and the second movable electrode portion 22 to have a function as an electrode. The first movable electrode portion 21 and the second movable electrode portion 22 may be formed with a conductive electrode layer provided on a non-conductive substrate.

The movable body 20 is supported by the beam 16 and can rotate using the beam 16 as a shaft. As the movable body 20 performs see-saw swing (inclination) using the beam 16 as a fulcrum, a gap (distance) between the first movable electrode portion 21 and the first fixed electrode portion 11 and a gap (distance) between the second movable electrode portion 22 and the second fixed electrode portion 12 are changed. The physical quantity detection element 1 can change capacitance generated between the first movable electrode portion 21 and the first fixed electrode portion 11 and between the second movable electrode portion 22 and the second fixed electrode portion 12, according to the inclination of the movable body 20.

When acceleration in the vertical direction (for example, acceleration of gravity) is applied to the movable body 20, a rotation moment (moment of force) is generated in each of the first movable body 20a and the second movable body 20b. Herein, when the rotation moment (for example, counterclockwise rotation moment) of the first movable body 20a, and the rotation moment (for example, clockwise rotation moment) of the second movable body 20b are balanced, a change in inclination of the movable body 20 does not occur, and it is difficult to detect the acceleration. Accordingly, the movable body 20 is designed so that the rotation moment of the first movable body 20a and the rotation moment of the second movable body 20b are not balanced and a change in inclination of the movable body 20 occurs, when the acceleration in the vertical direction is applied thereto.

In the physical quantity detection element 1, the first movable body 20a and the second movable body 20b have different masses from each other, by disposing the beam 16 in a position deviated from a center of gravity of the movable body 20 in the X axis direction (by differentiating a distance from the beam 16 to an end surface of the first movable body 20a, from a distance from the beam to an end surface of the second movable body 20b). That is, in the movable body 20, one movable body (first movable body 20a) and the other movable body (second movable body 20b) have different mass from each other, with the center line CL2 of the beam 16 as a starting point. In the example shown in the drawing, the distance from the beam 16 to the end surface of the first movable body 20a in the negative X axis direction is greater than the distance from the beam 16 to the end surface of the second movable body 20b in the positive X axis direction. In addition, a thickness of the first movable body 20a is substantially equivalent to a thickness of the second movable body 20b. Accordingly, the mass of the first movable body 20a is greater than the mass of the second movable body 20b. As described above, since the first movable body 20a and the second movable body 20b have different mass from each other, it is possible to cause the rotation moment of the first movable body 20a and the rotation moment of the second movable body 20b which are generated when the acceleration in the vertical direction is applied to the movable body 20, not to be balanced. Therefore, the movable body 20 can be inclined when the acceleration in the vertical direction is applied thereto.

In the movable body 20, capacitance (variable capacitance) C1 is configured between the first movable electrode portion 21 and the first fixed electrode portion 11. In addition, capacitance (variable capacitance) C2 is configured between the second movable electrode portion 22 and the second fixed electrode portion 12. The capacitance C1 changes depending on the gap (distance) between the first movable electrode portion 21 and the first fixed electrode portion 11, and the capacitance C2 changes depending on the gap (distance) between the second movable electrode portion 22 and the second fixed electrode portion 12.

For example, the capacitance items C1 and C2 have capacitance values substantially equivalent to each other, in a horizontal state of the movable body 20 with respect to the substrate 10. In detail, in a plan view from the Z axis direction, an area in which the first movable electrode portion 21 and the first fixed electrode portion 11 are overlapped with each other, and an area in which the second movable electrode portion 22 and the second fixed electrode portion 12 are overlapped with each other are equivalent to each other, and in a side view from the Y axis direction, the gap between the first movable electrode portion 21 and the first fixed electrode portion 11 and the gap between the second movable electrode portion 22 and the second fixed electrode portion 12 are equivalent to each other, and therefore, the capacitance values of capacitance items C1 and C2 are equivalent to each other.

In addition, when the acceleration in the vertical direction is applied to the movable body 20 and the movable body 20 is inclined with the beam 16 as a shaft, the capacitance values of capacitance items C1 and C2 change depending on the inclination of the movable body 20. Since the gap between the first movable electrode portion 21 and the first fixed electrode portion 11 and the gap between the second movable electrode portion 22 and the second fixed electrode portion 12 are different from each other in a state where the movable body 20 is inclined, the capacitance values of capacitance items C1 and C2 are also different from each other.

Herein, a relationship between an operation of the physical quantity detection element and the capacitance will be described in detail, with reference to FIGS. 3A to 3D. FIGS. 3A to 3D are cross-sectional views each schematically showing an operation of the physical quantity detection element, and the configurations not necessary for the description of the operation are omitted in the drawings. Herein, it is assumed that the movable body is a plate-shaped rectangle having a uniform thickness and a penetration hole which will be described later is not provided therein, for convenience of description.

Figure 3A:
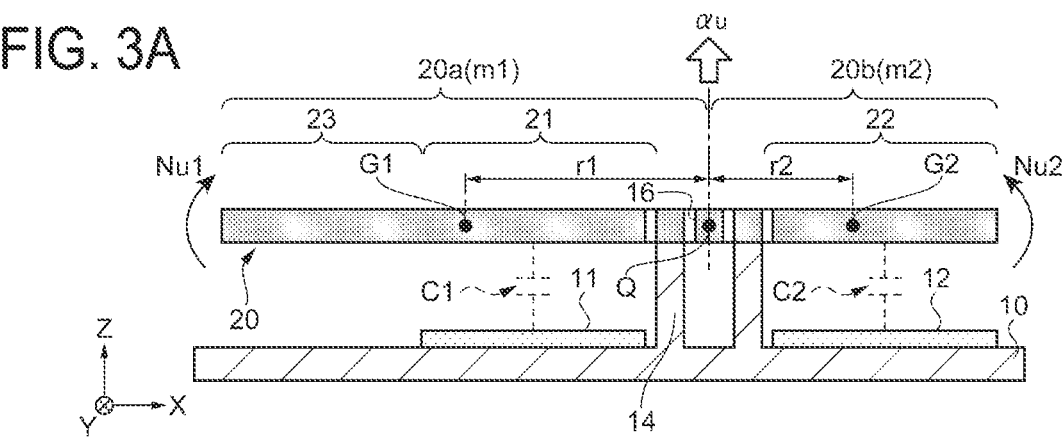
FIGS. 3A to 3D are cross-sectional views each schematically showing a relationship between an operation of a physical quantity detection element and capacitance.

FIG. 3A is a diagram illustrating a case in which acceleration αu in the positive Z axis direction is applied to the physical quantity detection element 1 in which the movable body 20 is positioned in a substantially horizontal state with respect to the substrate 10.

The movable body 20 is a plate-shaped rectangle having a uniform thickness (dimension in the Z axis direction). The first movable body 20a has mass m1 and a center of gravity G1 thereof is positioned at a distance r1 in the negative X axis direction from a center Q of the beam 16 rotatably supported by the support 14. The second movable body 20b has mass m2 and a center of gravity G2 thereof is positioned at a distance r2 in the positive X axis direction from the center Q of the beam 16. Since the first movable body 20a has a rectangular shape having a longer side in the X axis direction than that of the second movable body 20b, the mass m1 of the first movable body 20a is greater than the mass m2 of the second movable body 20b, and the distance r1 at which the center of gravity G1 of the first movable body 20a is positioned, is longer than the distance r2 at which the center of gravity G2 of the second movable body 20b is positioned.

When the acceleration αu towards the positive Z axis direction from the negative Z axis direction is applied with respect to the physical quantity detection element 1, a first rotation moment Nu1 corresponding to the product of the mass m1, the acceleration αu, and the distance r1 acts clockwise with the center Q of the beam 16 as a rotation shaft, in the first movable body 20a. Meanwhile, a second rotation moment Nu2 corresponding to the product of the mass m2, the acceleration αu, and the distance r2 is operated to the second movable body 20b counterclockwise with the center Q of the beam 16 as a rotation shaft. Since the mass m1 of the first movable body 20a is greater than the mass m2 of the second movable body 20b and the distance r1 at which the center of gravity G1 of the first movable body 20a is positioned is longer than the distance r2 at which the center of gravity G2 of the second movable body 20b is positioned, the first rotation moment Nu1 operated to the first movable body 20a is greater than the second rotation moment Nu2 operated to the second movable body 20b.

Figure 3B:
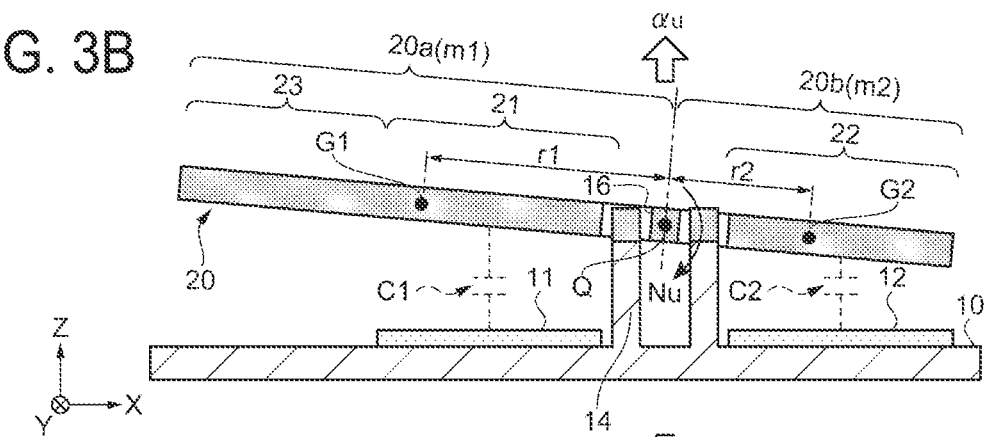

Accordingly, as shown in FIG. 3B, torque Nu corresponding to a difference between the first rotation moment Nu1 (see FIG. 3A) and the second rotation moment Nu2 (see FIG. 3A) is operated to the beam 16 clockwise with the center Q of the beam 16 as a rotation shaft, and the movable body 20 is inclined clockwise. Thus, the gap between the first movable electrode portion 21 of the first movable body 20a and the first fixed electrode portion 11 increases (is widened), and the capacitance value of the capacitance C1 between the first movable electrode portion 21 and the first fixed electrode portion 11 decreases. Meanwhile, the second movable electrode portion 22 of the second movable body 20b and the second fixed electrode portion 12 decreases (is narrowed), and the capacitance value of the capacitance C2 between the second movable electrode portion 22 and the second fixed electrode portion 12 increases.

Figure 3C:
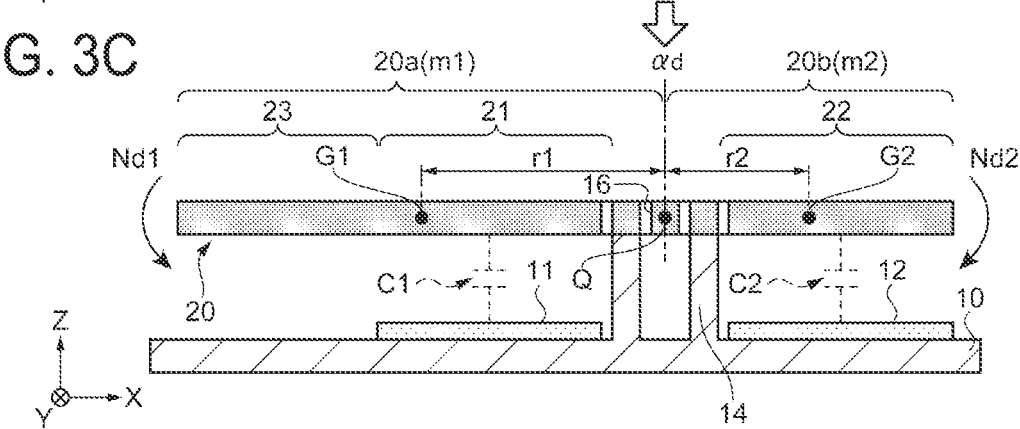

FIG. 3C is a diagram illustrating a case in which acceleration αd in the negative Z axis direction is applied to the physical quantity detection element 1 in which the movable body 20 is positioned in a substantially horizontal state with respect to the substrate 10.

When the acceleration αd towards the negative Z axis direction from the positive Z axis direction is applied with respect to the physical quantity detection element 1, a first rotation moment Nd1 corresponding to the product of the mass m1, the acceleration αu, and the distance r1 is operated to the first movable body 20a counterclockwise with the center Q of the beam 16 as a rotation shaft. Meanwhile, a second rotation moment Nd2 corresponding to the product of the mass m2, the acceleration αd, and the distance r2 is operated to the second movable body 20b clockwise with the center Q of the beam 16 as a rotation shaft. Since the mass m1 of the first movable body 20a is greater than the mass m2 of the second movable body 20b and the distance r1 at which the center of gravity G1 of the first movable body 20a is positioned is longer than the distance r2 at which the center of gravity G2 of the second movable body 20b is positioned, the first rotation moment Nd1 operated to the first movable body 20a is greater than the second rotation moment Nd2 operated to the second movable body 20b.

Figure 3D:
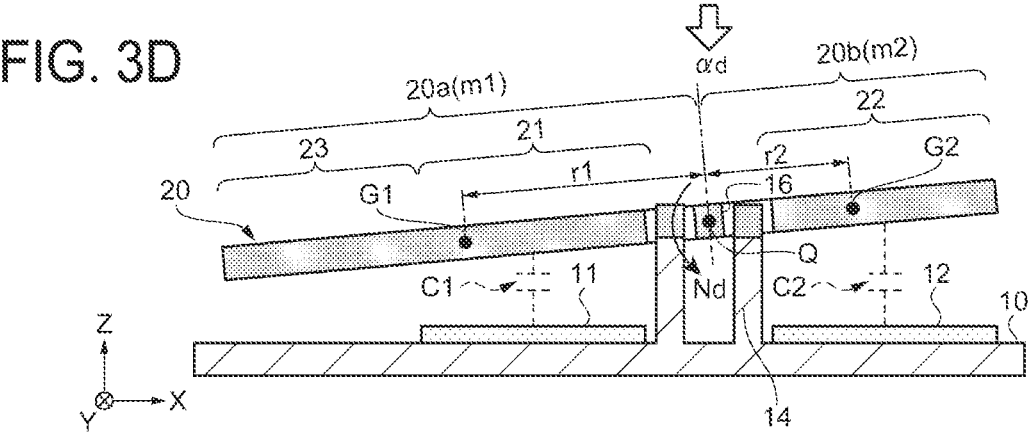

Accordingly, as shown in FIG. 3D, torque Nd corresponding to a difference between the first rotation moment Nd1 (see FIG. 3C) and the second rotation moment Nd2 (see FIG. 3C) is operated to the beam 16 counterclockwise with the center Q of the beam 16 as a rotation shaft, and the movable body 20 is inclined counterclockwise. Thus, the gap between the first movable electrode portion 21 of the first movable body 20a and the first fixed electrode portion 11 is decreased (is narrowed), and the capacitance value of the capacitance C1 between the first movable electrode portion 21 and the first fixed electrode portion 11 is increased. Meanwhile, the second movable electrode portion 22 of the second movable body 20b and the second fixed electrode portion 12 is increased (is widened), and the capacitance value of the capacitance C2 between the second movable electrode portion 22 and the second fixed electrode portion 12 is decreased.

The physical quantity detection element 1 can significantly incline the movable body 20, by increasing the torque Nu and Nd operated to the beam 16. Accordingly, the fluctuation in the capacitance values of the capacitance C1 and C2 is great, and thus it is possible to improve sensitivity for detecting the physical quantity of the physical quantity detection element 1.

As described above, the increase in the torque Nu and Nd can be realized by setting the mass m1 of the first movable electrode portion 21 to be greater than the mass m2 of the second movable electrode portion 22 or/and setting the distance r1 between the center of gravity G1 of the first movable body 20a and the center Q of the beam 16 to be longer than the distance r2 between the center of gravity G2 of the second movable body 20b and the center Q of the beam 16. Therefore, in the physical quantity detection element 1, it is possible to improve the sensitivity for detecting the physical quantity, by increasing the difference between the mass m1 of the first movable electrode portion 21 and the mass m2 of the second movable electrode portion 22 or/and increasing the difference between the distance r1 between the center of gravity G1 of the first movable body 20a and the center Q of the beam 16 and the distance r2 between the center of gravity G2 of the second movable body 20b and the center Q of the beam 16. In addition, in the physical quantity detection element 1, there is a method of improving the sensitivity for detecting the physical quantity, by narrowing a width of the beam 16 which functions as a torsion spring in the X axis direction, in order to decrease toughness of the spring, and increase the inclination of the movable body 20.

Next, by returning to FIG. 1 and FIG. 2, a penetration hole provided on the movable body will be described.

When the acceleration in the vertical direction is applied to the movable body 20 and the movable body 20 swings, the damping (motion for stopping motion of the movable body, flow resistance) generated due to gaseous viscosity decreases, and accordingly, first penetration holes 26 and second penetration holes 27 which penetrate through the movable body 20 in the Z axis direction are provided on the movable body 20. The plurality of first penetration holes 26 are provided on the first movable electrode portion 21 and the second movable electrode portion 22, and the plurality of second penetration holes 27 are provided on the first mass portion 23. In the embodiment, the first penetration holes 26 having the same shape as each other and disposed in matrix to have 3 rows and 3 columns, are provided on the first movable electrode portion 21 and the second movable electrode portion 22, and the plurality of second penetration holes 27 having the same shape as each other and disposed in matrix to have 2 rows and 2 columns, are provided on the first mass portion 23. The plurality of first penetration holes 26 and the second penetration holes 27 may have different shapes from each other. In addition, positions for disposing the first penetration holes 26 and the second penetration holes 27 or the number thereof can be freely set.

In the embodiment, since mass per unit area of the first mass portion 23 (value obtained by dividing the mass of the first mass portion 23 by the area of the first mass portion 23) is greater than mass per unit area of the first movable electrode portion 21 (value obtained by dividing the mass of the first movable electrode portion 21 by the area of the first movable electrode portion 21), it is possible to improve sensitivity for detecting the physical quantity of the physical quantity detection element 1. In the specific description with reference to FIG. 1 and FIG. 3A, the mass per unit area of the first mass portion 23 is set to be greater than the mass per unit area of the first movable electrode portion 21 while the mass m1 of the first movable body 20a is maintained as it is, and accordingly, the position of the center of gravity G1 of the first movable body 20a is moved in the negative X axis direction. Accordingly, the difference between the distance r1 between the center of gravity G1 of the first movable body 20a and the center Q of the beam 16, and the distance r2 between the center of gravity G2 of the second movable body 20b and the center Q of the beam 16 is set to be great, and thus it is possible to improve sensitivity for detecting the physical quantity of the physical quantity detection element 1. In general, the increase in mass relates to the improvement of rigidity, and accordingly the rigidity of the first mass portion 23 is higher than the rigidity of the first movable electrode portion 21, and thus it is possible to prevent damage to the first mass portion 23 when the end portion of the first mass portion 23 comes in contact with the substrate 10.

In the embodiment, the plurality of second penetration holes are provided on the first mass portion, and the plurality of first penetration holes are provided on the first movable electrode portion. Since an average dimension of gaps L2 of the second penetration holes 27 adjacent to each other in a direction (X axis direction) orthogonal to the beam 16 is greater than an average dimension of gaps L1 of the first penetration holes 26 adjacent to each other in the X axis direction, it is possible to improve sensitivity for detecting physical quantity of the physical quantity detection element 1. In the specific description with reference to FIG. 1 and FIG. 3A, in general, as a dimension of the penetration holes of the objects adjacent to each other in which the plurality of penetration holes are provided increases, the mass of the object increases. Accordingly, since the mass of the first mass portion 23 is greater than the mass of the first movable electrode portion 21, the position of the center of gravity G1 of the first movable body 20a is moved in the negative X axis direction. Accordingly, since the difference between the distance r1 at which the center of gravity G1 of the first movable body 20a is positioned, and the distance r2 at which the center of gravity G2 of the second movable body 20b is positioned can be set to be great, it is possible to improve sensitivity for detecting the physical quantity of the physical quantity detection element 1. Since the mass of the first mass portion 23 is greater than the mass of the first movable electrode portion 21, it is possible to prevent damage to the first mass portion 23 when the end portion of the first mass portion 23 comes in contact with the substrate 10.

For example, the width in the X axis direction of the beam 16 which functions as a torsion spring is set to be smaller than the average dimension of the gaps L2 of the second penetration holes 27 adjacent to each other in the X axis direction, in order to decrease toughness of the spring, and thus inclination of the movable body 20 can be great. Therefore, it is possible to improve sensitivity for detecting the physical quantity of the physical quantity detection element 1.

In the embodiment, the plurality of second penetration holes are provided on the first mass portion, and the plurality of first penetration holes are provided on the first movable electrode portion. Since an average dimension of gaps R2 of the second penetration holes 27 adjacent to each other in a direction (Y axis direction) parallel with the beam 16 is greater than an average dimension of gaps R1 of the first penetration holes 26 adjacent to each other in the Y axis direction, it is possible to improve sensitivity for detecting physical quantity of the physical quantity detection element 1. Accordingly, since the mass of the first mass portion 23 is greater than the mass of the first movable electrode portion 21, the position of the center of gravity G1 of the first movable body 20a is moved in the negative X axis direction. Accordingly, the difference between the distance r1 between the center of gravity G1 of the first movable body 20a and the center Q of the beam 16, and the distance r2 between the center of gravity G2 of the second movable body 20b and the center Q of the beam 16 is set to be great, and thus it is possible to improve sensitivity for detecting the physical quantity of the physical quantity detection element 1. Since the mass of the first mass portion 23 is greater than the mass of the first movable electrode portion 21, it is possible to prevent damage to the first mass portion 23 when the end portion of the first mass portion 23 comes in contact with the substrate 10.

In the embodiment, when the movable body 20 is divided into two by a center line CL1 in a direction (X axis direction) orthogonal to an extension direction of the beam 16 at an area ratio, the masses of the divided portions are equivalent to each other. In a plan view from the Z axis direction, even when the size or disposition of the first penetration holes 26 and the second penetration holes 27 are different from each other and the first penetration holes and the second penetration holes are not symmetrical to each other, the mass of an area 20c and the mass of an area 20d are equivalent to each other, and accordingly, it is possible to cause the see-saw swing of the movable body while maintaining horizontally two sides parallel with the Y axis of the movable body 20, when the acceleration in the Z axis direction is applied to the movable body 20. Thus, it is possible to prevent torsional swing of the movable body 20, and therefore it is possible to improve detection accuracy of the physical quantity detection element 1.

In the embodiment, the movable body 20 is provided line-symmetrically with respect to the center line CL1. Since the first penetration holes 26 and the second penetration holes 27 are provided on the movable body 20 with respect to the center line CL2, the masses of the area 20c and the area 20d are equivalent to each other and damping (air drag) received in each area is also symmetrical to each other. Therefore, it is advantageous to prevent torsional swing of the movable body 20 and to improve detection accuracy of the physical quantity detection element 1.

In the embodiment, the configuration in that the movable body 20 is provided through the support 14 which is provided to stand in the positive Z axis direction from the main surface 10a between the first fixed electrode portion 11 and the second fixed electrode portion 12 and the beam 16 supported by the support 14 is described, but it is not limited to this configuration. For example, a frame-shaped supporting body which surrounds the outer periphery of the movable body may be provided to have a predetermined gap with the movable body, in a plan view from the Z axis direction, and the movable body may be configured to be supported by a beam extended in the Y axis direction from the support provided on the supporting body.

As described above, according to the physical quantity detection element 1 of the embodiment, the following effects can be obtained.

At least one average dimension of the adjacent gaps L2 and R2 of the plurality of second penetration holes 27 provided on the first mass portion 23 is greater than the average dimension of the adjacent gaps L1 and/or R1 of the plurality of first penetration holes 26 provided on the first movable electrode portion 21. Since the movable body 20 has a uniform thickness, the mass of the first mass portion 23 is greater than the mass of the first movable electrode portion 21, and the position of the center of gravity G1 of the first movable body 20a is moved in the negative X axis direction. Accordingly, the difference between the distance r1 between the center of gravity G1 of the first movable body 20a and the center Q of the beam 16, and the distance r2 between the center of gravity G2 of the second movable body 20b and the center Q of the beam 16 is set to be great, and thus it is possible to improve sensitivity for detecting the physical quantity of the physical quantity detection element 1. That is, it is possible to realize miniaturization while maintaining detection sensitivity. Since the rigidity of the first mass portion 23 is higher than the rigidity of the first movable electrode portion 21, it is possible to prevent damage to the first mass portion 23 when the end portion of the first mass portion 23 comes in contact with the substrate 10. Therefore, it is possible to provide the physical quantity detection element 1 which can improve detection sensitivity and reliability and realize miniaturization.

Embodiment 2

Figure 4:
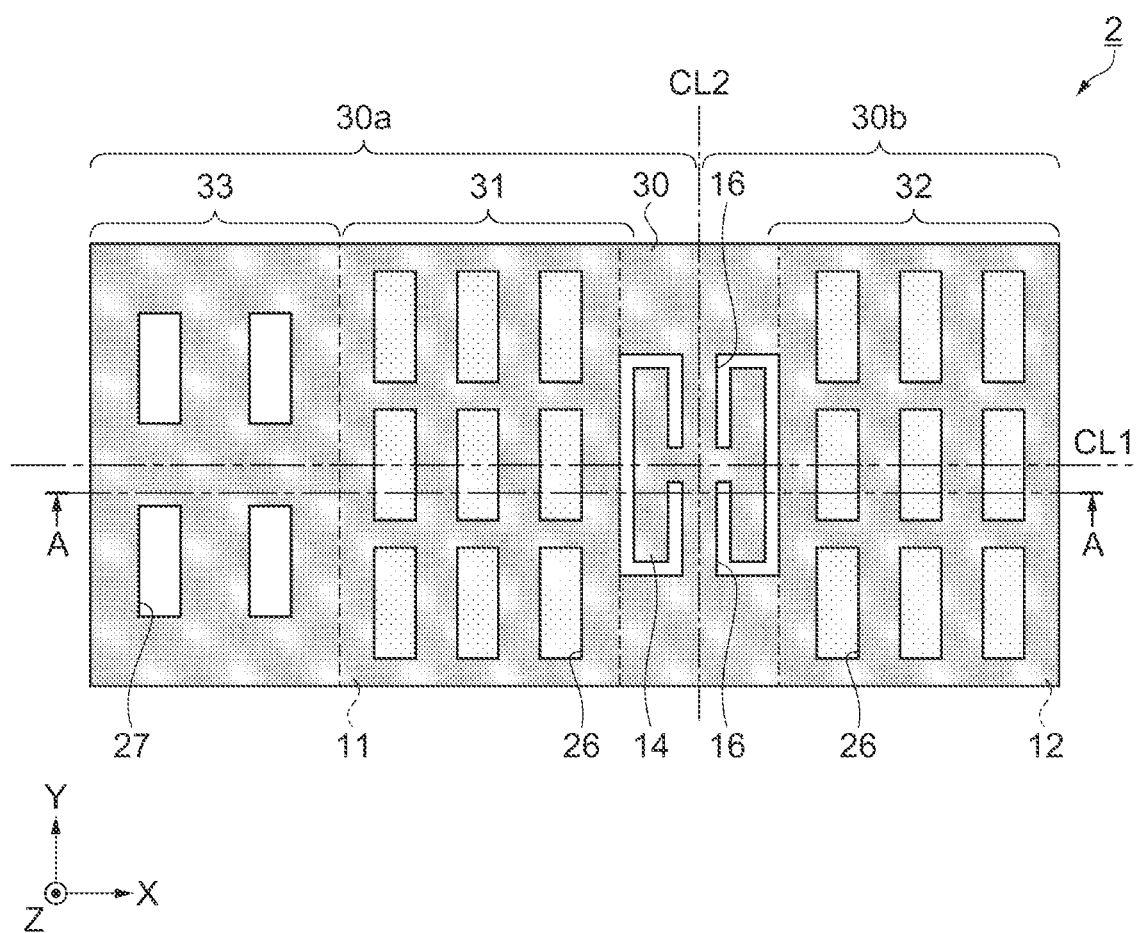
FIG. 4 is a plan view schematically showing a physical quantity detection element according to Embodiment 2.
Figure 5:
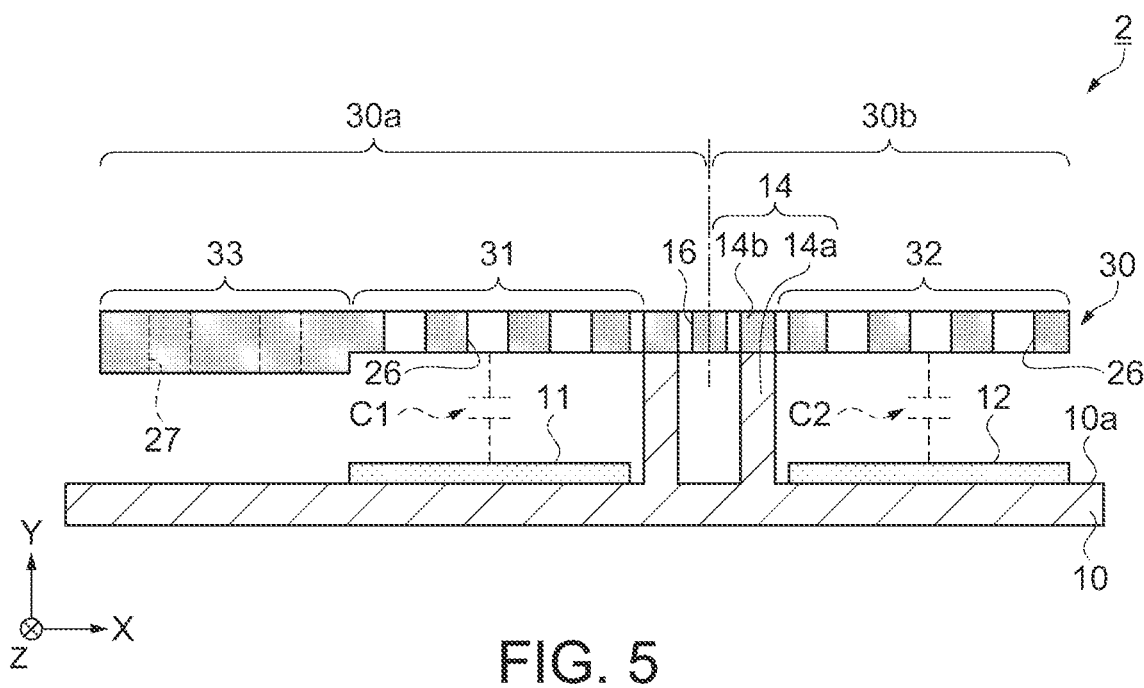
FIG. 5 is a cross-sectional view taken along line A-A in FIG. 4.

FIG. 4 is a plan view schematically showing a physical quantity detection element according to Embodiment 2. FIG. 5 is a cross-sectional view taken along line A-A in FIG. 4.

The physical quantity detection element according to the embodiment will be described with reference to the drawings. The same reference numerals are used for the same constituent elements as those in Embodiment 1, and the overlapped description will be omitted. The physical quantity detection element of the embodiment is different from the configuration of Embodiment 1, in that a movable body having different thicknesses of a first mass portion and a first movable electrode portion is provided.

As shown in FIG. 4 and FIG. 5, a physical quantity detection element 2 includes the substrate 10, the first fixed electrode portion 11 and the second fixed electrode portion 12 provided on the main surface 10a of the substrate 10, a movable body 30 which is provided with a gap interposed between the movable body and the substrate 10, through the support 14 which is provided to stand in the positive Z axis direction from the main surface 10a between the first fixed electrode portion 11 and the second fixed electrode portion 12 and the beam 16 supported by the support 14.

The movable body 30 is integrally formed with the support 14b and the beam 16 supported by the support 14b, and is provided with a gap interposed between the movable body and the substrate 10, through the supports 14a and 14b and the beam 16. In the movable body 30, a first movable electrode portion 31 and a first mass portion 33 are provided in this order in the negative X axis direction from the beam 16, and a second movable electrode portion 32 is provided in the positive X axis direction from the beam 16. In the description hereinafter, in the movable body 30, an area on the negative X axis direction from a center line CL2 of the beam 16 is referred to as a first movable body 30a, and an area on the positive X axis direction from the center line CL2 of the beam 16 is referred to as a second movable body 30b.

The movable body 30 has a rectangular plate shape in a plan view from the Z axis direction, and in the embodiment, a dimension of the first mass portion 33 in a thickness direction (Z axis direction) is greater than each dimension of the first movable electrode portion 31 and the second movable electrode portion 32 in the thickness direction (Z axis direction). Accordingly, the mass of the first mass portion 33 increases, and thus the position of the center of gravity of the first movable body 30a is moved in the negative X axis direction. Accordingly, the difference between the distance r1 between the center of gravity G1 of the first movable body 30a and the center Q of the beam 16, and the distance r2 between the center of gravity G2 of the second movable body 30b and the center Q of the beam 16 is set to be great, and thus it is possible to improve sensitivity for detecting the physical quantity of the physical quantity detection element 2. Since the mass of the first mass portion 33 is greater than the mass of the first movable electrode portion 31, it is possible to prevent damage to the first mass portion 33 when the end portion of the first mass portion 33 comes in contact with the substrate 10.

In the embodiment, the configuration of the movable body 30 has different thicknesses by setting a boundary of the first mass portion 33 and the first movable electrode portion 31, but it is not limited to this configuration. For example, the thickness of the first movable body 30a may sequentially increase in a stepwise manner or may be increased gently, from the positive X axis direction towards the negative X axis direction.

As described above, according to the physical quantity detection element 2 of the embodiment, the following effects can be obtained, in addition to the effects in Embodiment 1.

The physical quantity detection element 2 includes the movable body 30 having different thicknesses of the first mass portion 33 and the first movable electrode portion 31. The thickness of the first mass portion 33 is greater than the thickness of the first movable electrode portion 31, and when the mass of the first movable body 30a increases, the position of the center of gravity moves in the negative X axis direction. Accordingly, it is possible to further improve sensitivity for detecting the physical quantity of the physical quantity detection element 2. That is, it is possible to realize miniaturization while maintaining detection sensitivity. Since the rigidity of the first mass portion 33 is higher than the rigidity of the first movable electrode portion 31, it is possible to prevent damage to the first mass portion 33 when the end portion of the first mass portion 33 comes in contact with the substrate 10. Therefore, it is possible to provide the physical quantity detection element 2 which can improve detection sensitivity and reliability and realize miniaturization.

The invention is not limited to the embodiments described above, and various modifications or improvements can be added to the embodiments described above.

In Embodiment 1, as shown in FIG. 1, the configuration in which the adjacent gaps of the plurality of second penetration holes 27 provided on the first mass portion 23 are set to be greater than the adjacent gaps of the plurality of first penetration holes 26 provided on the first movable electrode portion 21, in order to increase the mass of the first movable body 20a, and the position of the center of gravity is changed in the negative X axis direction, and it is not limited to this configuration. Hereinafter, modification examples will be described.

Modification Example 1

Figure 6:
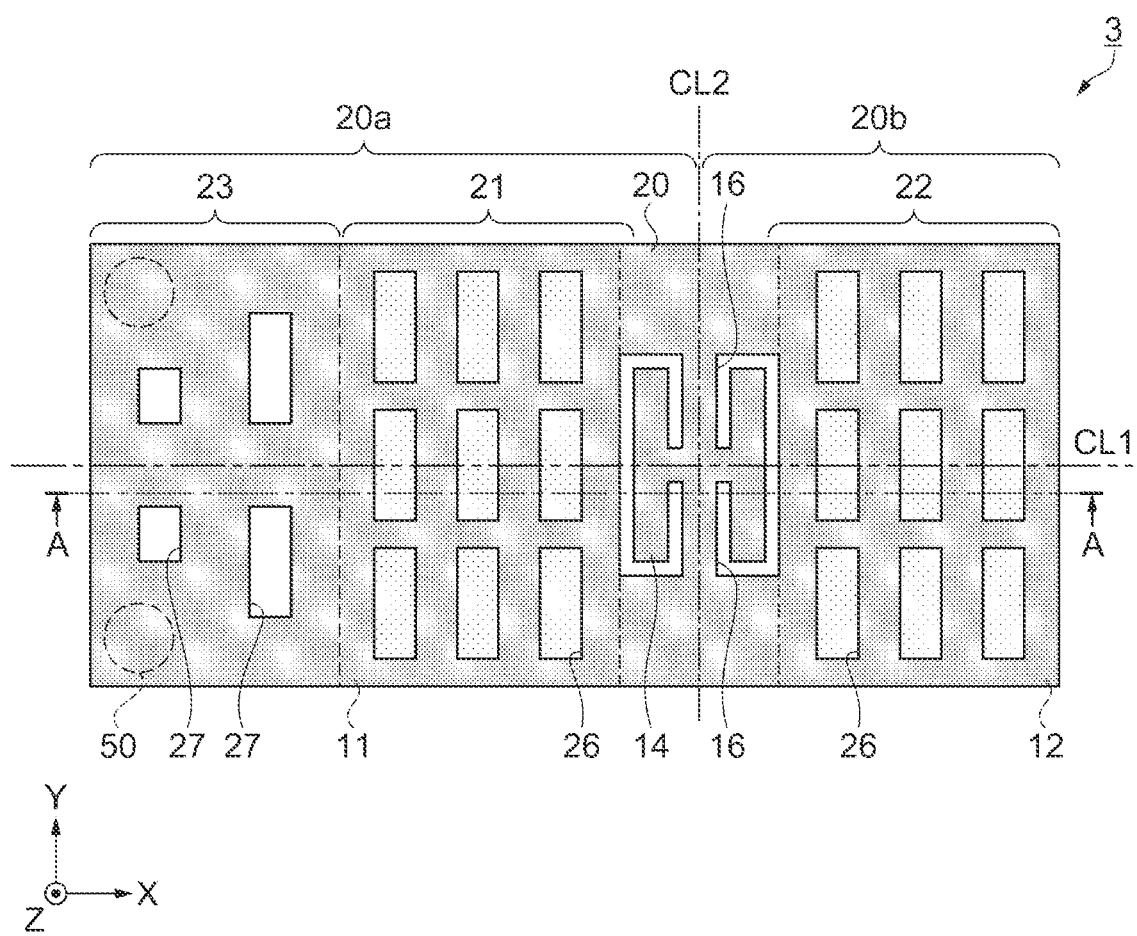
FIG. 6 is a plan view schematically showing a physical quantity detection element according to Modification Example 1.
Figure 7:
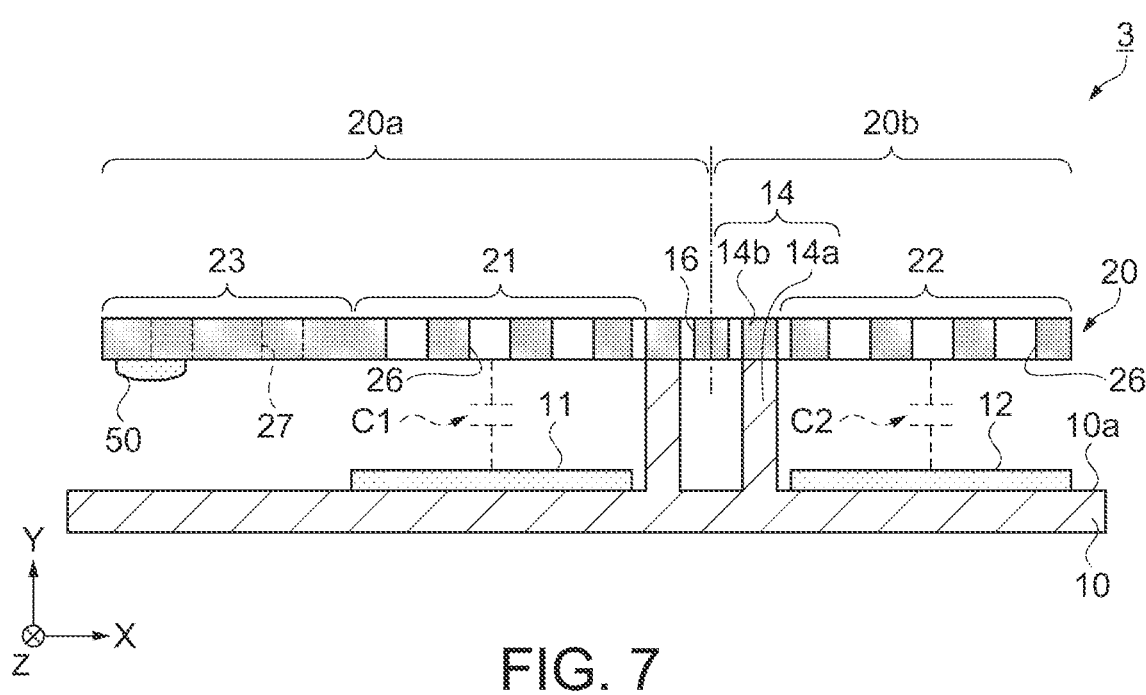
FIG. 7 is a cross-sectional view taken along line A-A in FIG. 6.

FIG. 6 is a plan view schematically showing a physical quantity detection element according to Modification Example 1. FIG. 7 is a cross-sectional view taken along line A-A in FIG. 6.

Hereinafter, a physical quantity detection element 3 according to Modification Example 1 will be described. The same reference numerals are used for the same constituent elements as those in Embodiment 1, and the overlapped description will be omitted.

In the physical quantity detection element 3, buffer portions 50 having mass are provided on the surface of two corners formed on the first mass portion 23 on the substrate 10 side, in a plan view from the Z axis direction. As a material of the buffer portions 50, silicone having flexibility is used, in order to absorb an impact when the end portion of the first mass portion 23 comes in contact with the substrate 10. Accordingly, the mass of the first movable body 20a increases, and the position of the center of gravity is moved in the negative X axis direction, and therefore the same operation effects as those in the embodiments can be obtained. In the modification example, the physical quantity detection element includes the buffer portion 50 having flexibility, and therefore it is possible to provide the physical quantity detection element 3 with further improved reliability.

The shape or the number of the buffer portions 50 is not particularly limited, as long as the buffer portions include a part of an area where the first mass portion 23 may come in contact with the substrate 10. Since the buffer portions 50 receive an impact, the buffer portions are desirably provided on an area not including the second penetration holes 27, from a viewpoint of reliability.

Modification Example 2

Figure 8:
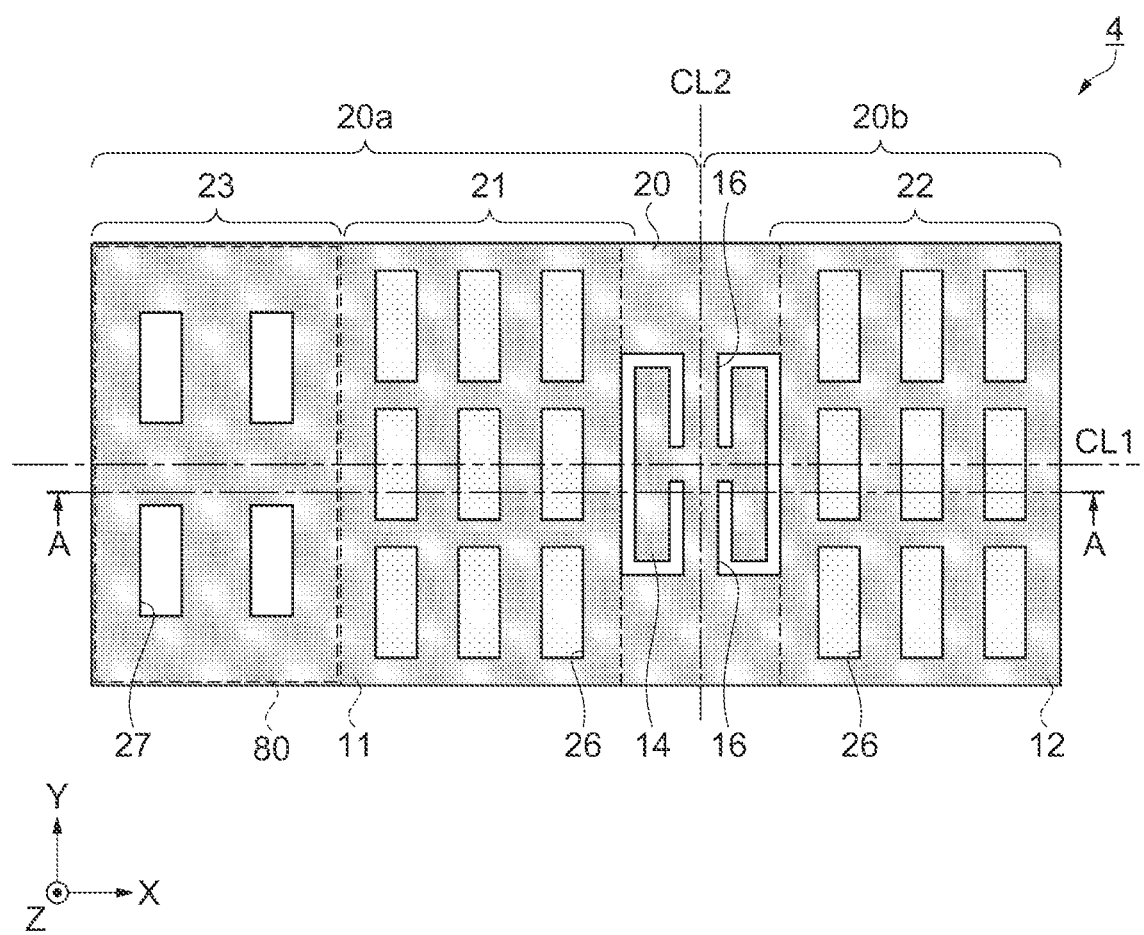
FIG. 8 is a plan view schematically showing a physical quantity detection element according to Modification Example 2.
Figure 9:
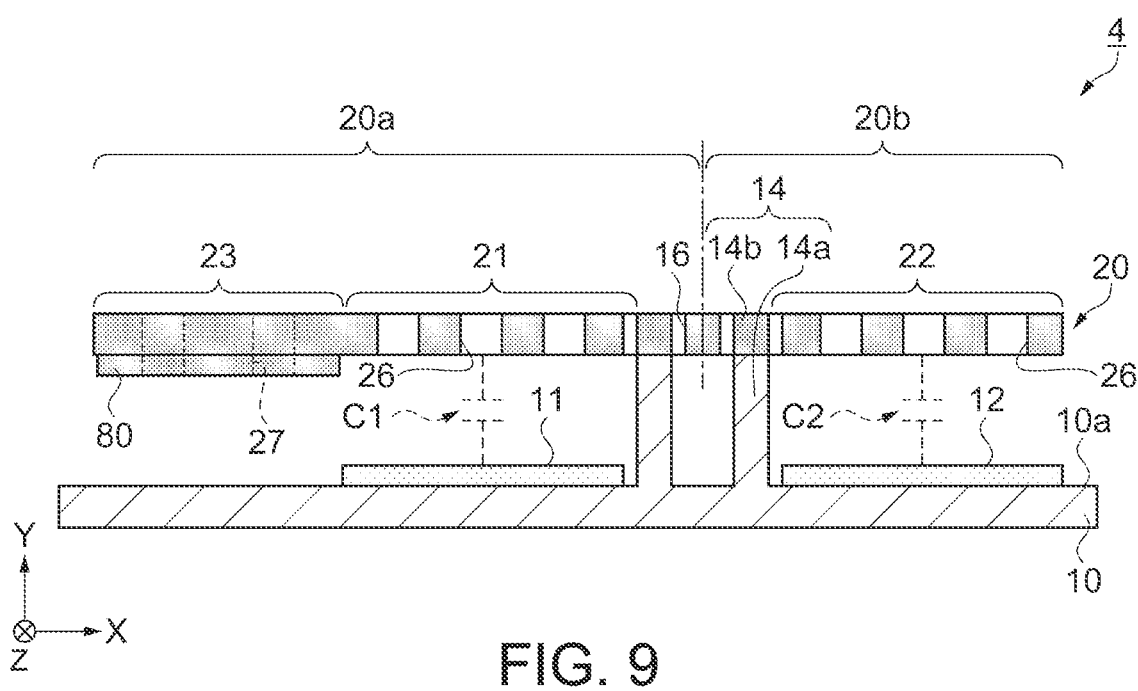
FIG. 9 is a cross-sectional view taken along line A-A in FIG. 8.

FIG. 8 is a plan view schematically showing a physical quantity detection element according to Modification Example 2. FIG. 9 is a cross-sectional view taken along line A-A in FIG. 8.

A physical quantity detection element 4 according to Modification Example 2 will be described. The same reference numerals are used for the same constituent elements as those in Embodiment 1, and the overlapped description will be omitted.

In the physical quantity detection element 4, an electrode 80 is provided on the surface of the first mass portion 23 on the substrate 10 side. By using a metal material having high specific gravity for the electrode 80, it is possible to efficiently increase the mass of the first mass portion 23. Accordingly, the mass of the first movable body 20a increases and the position of the center of gravity is moved in the negative X axis direction, and therefore the same operation effects as those in the embodiments can be obtained. In addition, an impact when the end portion of the first mass portion 23 comes in contact with the substrate 10 can be absorbed by using a metal material having low hardness for the electrode 80, and therefore it is possible to provide the physical quantity detection element 4 with further improved reliability.

Physical Quantity Detection Device

Figure 10:
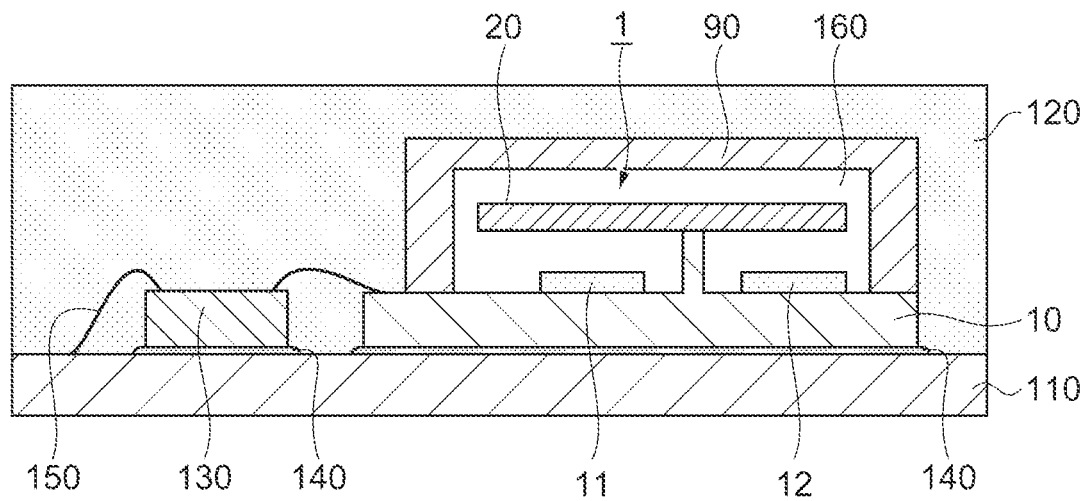
FIG. 10 is a cross-sectional view showing an outline of a physical quantity detection device including a physical quantity detection element.

Next, a physical quantity detection device to which the physical quantity detection element 1 according to the invention is applied will be described. FIG. 10 is a cross-sectional view showing an outline of a physical quantity detection device 100 including the physical quantity detection element 1.

The physical quantity detection element 1 covered with a cover 90 and an IC chip are mounted on a bottom surface of an interposer (IP) substrate 110, and the physical quantity detection device 100 is further covered with a mold resin 120.

The physical quantity detection element 1 is configured with the first fixed electrode portion 11 and the second fixed electrode portion 12 provided on the substrate 10, the movable body 20, and the like. The first fixed electrode portion 11 and the second fixed electrode portion 12, the movable body 20, and the substrate 10 are electrically connected with each other with a wire (not shown). The material of the cover 90 is not particularly limited, and in the physical quantity detection device 100, a conductive material including silicon which can be easily processed is used, as a preferable example. The cover 90 is bonded to the substrate 10 in which borosilicate glass is used, by anodic bonding. A cavity 160 of the physical quantity detection element 1 covered with the cover 90 is preferably in an inert gas atmosphere such as nitrogen.

A material such as glass fibers-containing epoxy is used for the IP substrate 110, and an external connection terminal and a wire (not shown) are formed therein. The substrate 10 of the physical quantity detection element 1 and the IC chip 130 are bonded to each other and supported on the IP substrate 110, through a fixed member 140 such as an adhesive. The material of the fixed member 140 is not particularly limited, and a composite resin including an epoxy resin as a base resin can be used. The IC chip 130 is electrically connected to the wires (not shown) formed on the substrate 10 and the IP substrate 110, through a wire 150 such as Au (gold). The IC chip 130 includes a detection circuit for outputting the physical quantity such as the acceleration applied to the physical quantity detection element 1.

Lastly, a surface of the IP substrate 110 on which the physical quantity detection element 1 and the like are mounted is covered with the mold resin 120, and accordingly the physical quantity detection device 100 can be configured.

As described above, since the miniaturized physical quantity detection element 1 with the improved detection sensitivity of the physical quantity and reliability is used in the physical quantity detection device 100, it is possible to provide the miniaturized physical quantity detection device 100 having high detection sensitivity and high reliability.

Electronic Apparatus

Next, an electronic apparatus including the physical quantity detection element 1 or the physical quantity detection device 100 according to the embodiment of the invention will be described with reference to FIG. 11 to FIG. 13. In the description, an example using the physical quantity detection element 1 is shown.

Figure 11:
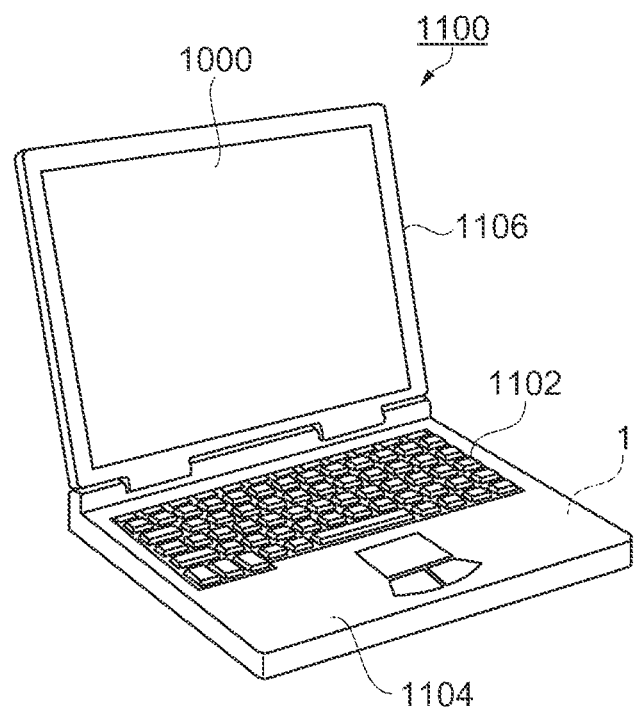
FIG. 11 is a perspective view showing a configuration of a mobile type (or note type) personal computer as an electronic apparatus including a physical quantity detection element.

FIG. 11 is a perspective view showing an outline of a configuration of a mobile type (or note type) personal computer 1100 as the electronic apparatus including the physical quantity detection element 1 according to Embodiment 1 of the invention. In the drawing, a personal computer 1100 is configured with a main body unit 1104 including a keyboard 1102 and a display unit 1106 including a display unit 1000, and the display unit 1106 is rotatably supported with respect to the main body unit 1104 through a hinge structure portion. The physical quantity detection element 1 which functions as an acceleration sensor is embedded in such a personal computer 1100.

Figure 12:
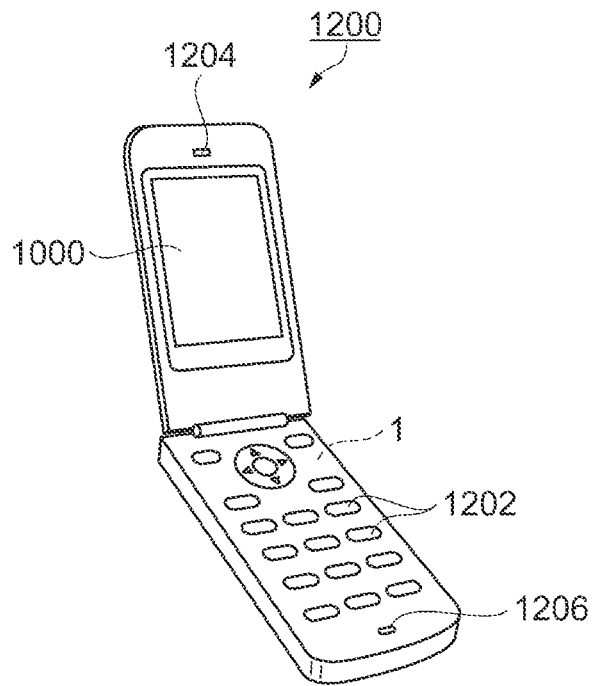
FIG. 12 is a perspective view showing a mobile phone as an electronic apparatus including a physical quantity detection element.

FIG. 12 is a perspective view showing an outline of a configuration of a mobile phone 1200 (including PHS) as the electronic apparatus including the physical quantity detection element 1 according to Embodiment 1 of the invention. In the drawing, the mobile phone 1200 includes a plurality of operation buttons 1202, an earpiece 1204, and a mouthpiece 1206, and a display unit 1000 disposed between the operation buttons 1202 and the earpiece 1204. The physical quantity detection element 1 which functions as an acceleration sensor or the like is embedded in such a mobile phone 1200.

Figure 13:
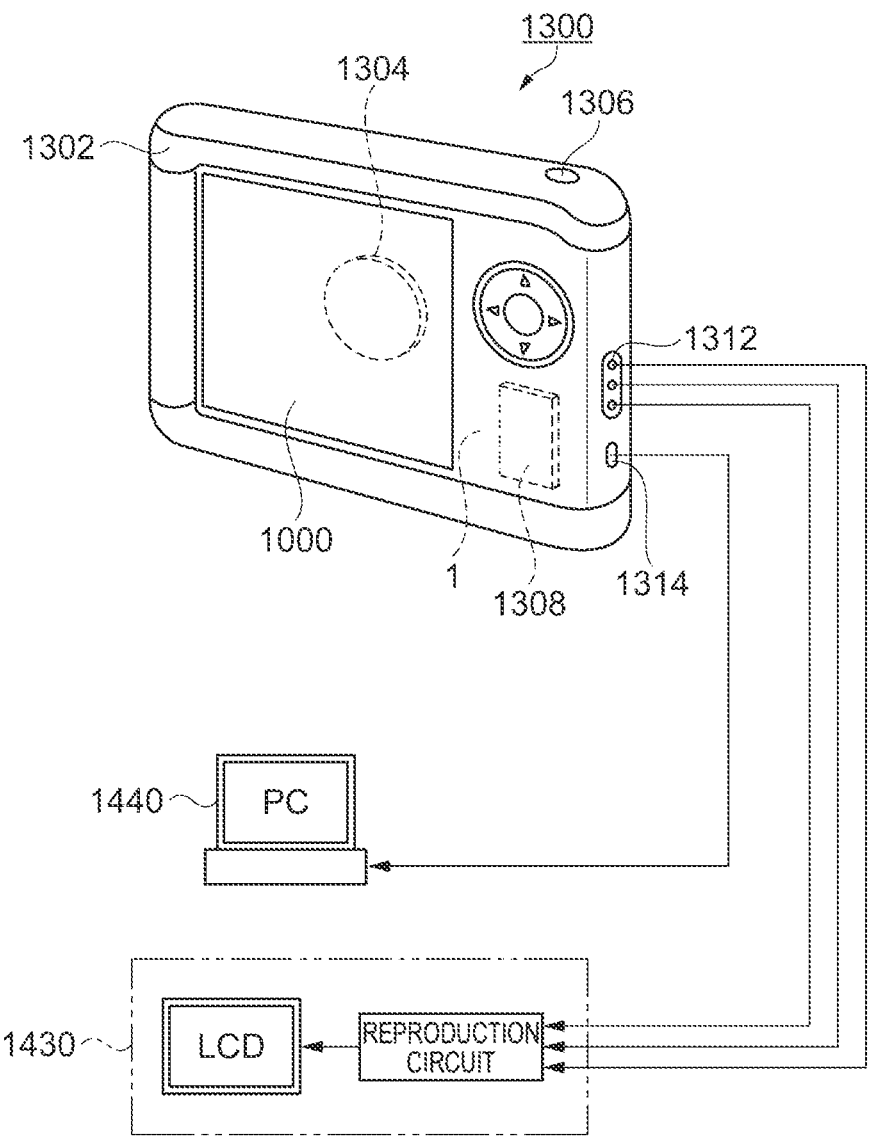
FIG. 13 is a perspective view showing a digital still camera as an electronic apparatus including a physical quantity detection element.

FIG. 13 is a perspective view showing an outline of a configuration of a digital still camera 1300 as the electronic apparatus including the physical quantity detection element 1 according to Embodiment 1 of the invention. The drawing also simply shows connection to an external device. Herein, the digital still camera 1300 generates an imaging signal (image signal) by performing photoelectric conversion of a light image of a subject by an imaging device such as charge coupled device (CCD), whereas a film camera of the related art exposes a silver-halide photo film by a light image of a subject.

A display unit 1000 is provided on a rear surface of a case (body) 1302 of the digital still camera 1300 and has a configuration of performing a display based on the imaging signal by the CCD, and the display unit 1000 functions as a finder for displaying a subject as an electronic image. A light receiving unit 1304 including an optical lens (optical imaging system) or the CCD is provided on a front surface side of the case 1302 (back surface side in the drawing).

When a photographer confirms a subject image displayed on the display unit 1000 and presses a shutter button 1306, an imaging signal of CCD at that point in time is transmitted and stored in a memory 1308. In the digital still camera 1300, a video signal output terminal 1312 and a data communication input and output terminal 1314 are provided on a side surface of the case 1302. As shown in the drawing, a television monitor 1430 is connected to the video signal output terminal 1312 and a personal computer 1440 is connected to the data communication input and output terminal 1314, respectively if necessary. In addition, the imaging signal stored in the memory 1308 is output to the television monitor 1430 or the personal computer 1440 by a predetermined operation. The physical quantity detection element 1 which functions as an acceleration sensor or the like is embedded in such a digital still camera 1300.

In addition to the personal computer 1100 (mobile type personal computer) shown in FIG. 11, the mobile phone 1200 shown in FIG. 12, and the digital still camera 1300 shown in FIG. 13, the physical quantity detection element 1 according to Embodiment 1 of the invention can be applied to an electronic apparatus such as an ink jet type discharging apparatus (for example, ink jet printer), a laptop type personal computer, a television, a video camera, a video camera recorder, a car navigation device, a pager, an electronic organizer (including communication function), an electronic dictionary, a calculator, an electronic game device, a word processor, a work station, a video phone, a security monitor, electronic binoculars, a POS terminal, medical equipment (for example, an electronic thermometer, a blood pressure meter, a blood glucose meter, an ECG measuring device, an ultrasound diagnostic device, an electronic endoscope), a fishfinder, a variety of measurement equipment, a meter (for example, a meter for vehicles, aircraft, or a ship), a flight simulator, or the like.

Moving Object

Figure 14:
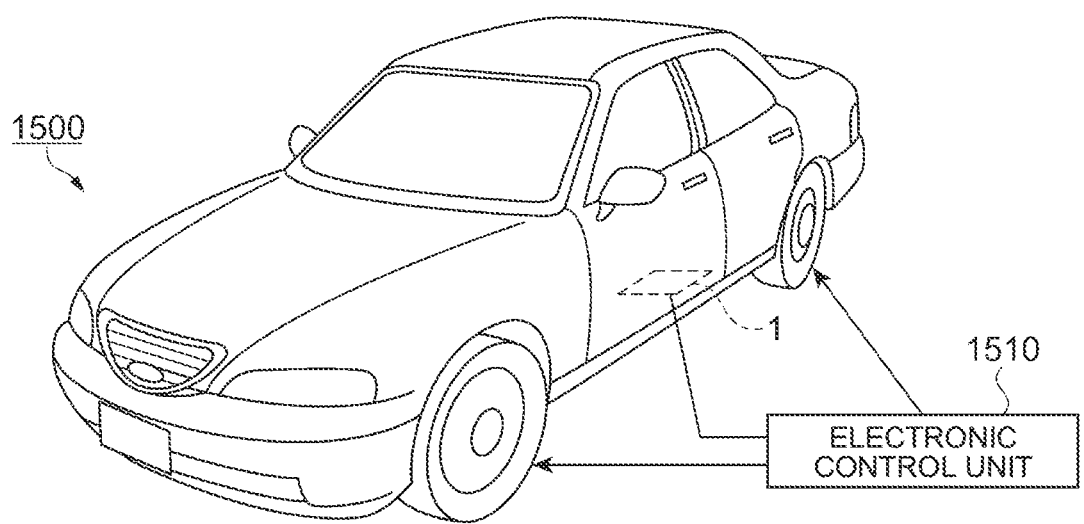
FIG. 14 is a perspective view showing a vehicle as a moving object including a physical quantity detection element.

FIG. 14 is a perspective view schematically showing a vehicle as an example of a moving object. The physical quantity detection element 1 according to Embodiment 1 is embedded in a vehicle 1500. For example, as shown in the drawing, the physical quantity detection element 1 is embedded in the vehicle 1500 as a moving object and an electronic control unit 1510 which controls such as tires is embedded in a vehicle body. The physical quantity detection element 1 can also be widely applied to an electronic control unit (ECU) such as a keyless entry, an immobilizer, a car navigation system, a car air conditioner, anti-lock brake system (ABS), an air bag, a tire pressure monitoring system (TPMS), an engine control, a battery charge monitor of a hybrid car or an electric car, or a vehicle body attitude control unit.

What is claimed is:
1. A physical quantity detection element comprising:
   a substrate;
   a first fixed electrode that is provided on a main surface of the substrate;
   a second fixed electrode that is provided on the main surface of the substrate, the second fixed electrode being spaced apart from the first fixed electrode via a gap along a first direction in a plan view; and a movable body that is provided above the main surface of the substrate, the movable body being configured with:

a first movable electrode that faces the first fixed electrode via a gap in the plan view;

a second movable electrode that faces the second fixed electrode via a gap in the plan view, each of the first and second movable electrodes having a plurality of first through holes;

a beam that extends in a second direction orthogonal to the first direction, the beam being provided between the first and second movable electrodes, the beam facing the main surface of the substrate via a gap in a third direction orthogonal to the first and second directions, the movable body being configured to move with respect to the beam relative to the main surface of the substrate; and a movable mass that extends from an end of the first movable electrode in the first direction away from the beam in the plan view, the movable mass having a plurality of second through holes, wherein when a distance between adjacent two of the plurality of first through holes in the second direction in the plan view is R1, a distance between adjacent two of the plurality of first though holes in the first direction in the plan view is L1, a distance between adjacent two of the plurality of second though holes in the second direction in the plan view is R2, and a distance between adjacent two of the plurality of second through holes in the first direction in the plan view is L2, at least one of:

R1<R2; and

L1<L2 is satisfied, and a width of the beam in the first direction is smaller than the distance L2.

2. The physical quantity detection element according to claim 1,
wherein a thickness of the movable mass is equivalent to a thickness of the first movable electrode.

3. The physical quantity detection element according to claim 1,
wherein a thickness of the movable mass is greater than a thickness of the first movable electrode.

4. The physical quantity detection element according to claim 1,
wherein a buffer is provided on a surface of the movable mass facing the main surface of the substrate.

5. The physical quantity detection element according to claim 2,
wherein an electrode is provided on a surface of the movable mass facing the main surface of the substrate.

6. The physical quantity detection element according to claim 1,
wherein when the movable body is divided into two by a center line in the first direction at an area ratio, masses of the divided portions are equivalent to each other.

7. The physical quantity detection element according to claim 1,
wherein the movable body is provided line-symmetrically with respect to a center line in the first direction in the plan view.

8. A physical quantity detection device comprising:
the physical quantity detection element according to claim 1; and
a detection circuit that outputs a signal indicating physical quantity applied to the physical quantity detection element.

9. A physical quantity detection device comprising:
the physical quantity detection element according to claim 2; and
a detection circuit that outputs a signal indicating physical quantity applied to the physical quantity detection element.

10. A physical quantity detection device comprising:
the physical quantity detection element according to claim 3; and
a detection circuit that outputs a signal indicating physical quantity applied to the physical quantity detection element.

11. A physical quantity detection device comprising:
the physical quantity detection element according to claim 4; and
a detection circuit that outputs a signal indicating physical quantity applied to the physical quantity detection element.

12. A physical quantity detection device comprising:
the physical quantity detection element according to claim 5; and
a detection circuit that outputs a signal indicating physical quantity applied to the physical quantity detection element.

13. An electronic apparatus comprising:
the physical quantity detection element according to claim 1; and
a case that houses the physical quantity detection element.

14. An electronic apparatus comprising:
the physical quantity detection element according to claim 2; and
a case that houses the physical quantity detection element.

15. An electronic apparatus comprising:
the physical quantity detection element according to claim 3; and
a case that houses the physical quantity detection element.

16. An electronic apparatus comprising:
the physical quantity detection element according to claim 4; and
a case that houses the physical quantity detection element.

17. A moving object comprising:
the physical quantity detection element according to claim 1; and
a controller that is configured to control an attitude of the moving object by using the physical quantity detection element.

18. A moving object comprising:
the physical quantity detection element according to claim 2; and
a controller that is configured to control an attitude of the moving object by using the physical quantity detection element.

19. A moving object comprising:
the physical quantity detection element according to claim 3; and
a controller that is configured to control an attitude of the moving object by using the physical quantity detection element.

20. A moving object comprising:
the physical quantity detection element according to claim 4; and a controller that is configured to control an attitude of the moving object by using the physical quantity detection element.

* * * * *